United States Patent Office 2,900,361
Patented Aug. 18, 1959

2,900,361

DIBENZOYL RESORCINOL LIGHT STABILIZER

Carl B. Havens, Hope, Mich., assignor to The Dow Chemical Company, Midland, Mich., a corporation of Delaware No Drawing. Application April 6, 1955
Serial No. 499,757

11 Claims. (Cl. 260—45.95)

This invention relates to new and improved thermoplastic compositions. More particularly, it relates to polymeric compositions having improved stability to the degradative effects of sunlight.

Thermoplastic compositions, particularly those prepared from haloethylene polymers, have found wide acceptance as useful materials for making foils, fibers, filaments, and other articles. The articles so produced are inherently strong, dimensionally stable, relatively inert to common household solvents, and are easily colored for an attractive appearance. However, such articles are subject to rapid and severe degradation and consequent discoloration due to the effects of heat and light. The problem becomes most serious when polymeric compositions are employed as filamentary materials in making window curtains, automobile seat covers, and other articles which are exposed for prolonged periods of time to direct sunlight. To overcome this disadvantage it has become most practical to incorporate certain additives into the composition to stabilize it to the effects of heat and to add other materials to the composition to stabilize it to the effects of light. Some of the prior light stabilizing materials have suffered from the disadvantages of bleeding out of articles made from vinyl or vinylidene halides. In addition, some of the materials are colored so that they impart an objectionable initial color which prevents the production of white articles. Further, many of the prior materials lose their effectiveness as light stabilizers after exposure to sunlight for a short time.

It is accordingly an object of this invention to provide improved polymeric composition having increased resistance to the degradative effects of light.

It is a particular object to provide such a composition which is based on a chloroethylene polymer and is resistant to the effects of light over prolonged periods of exposure to direct sunlight.

The above and related objects are achieved with a polymeric composition comprising a linear polymer or other thermoplastic material and stabilizing quantities of a derivative of dibenzoyl resorcinol having the general formula:

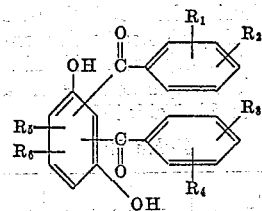

wherein $R_1$ to $R_5$, inclusive, may be H, Cl, Br, F, an alkyl group having from 1-8 carbon atoms, or —$COOR_7$ wherein $R_7$ may be an alkyl group having from 1-8 carbon atoms, phenyl, or a monochloro-, monobromo, or monoalkyl phenyl group, and $R_6$ may be benzoyl, benzoyl substituted with any of the values of $R_1$ and $R_2$, or any of the values of $R_1$. The compounds are further limited in that they may contain not more than 4 bromine atoms, not more than 3 fluorine atoms, and not over 3 —$COOR_7$ groups. In addition, there must not be over one —$COOR_7$ group on any benzene ring. The compositions of this invention show effective resistance to the degradative effects of light even after prolonged exposure.

Among the specific compounds defined by the foregoing formula and which have light stabilizing action in thermoplastic compositions are:

2,4-dibenzoyl resorcinol
4,6-dibenzoyl resorcinol
2,4-dibenzoyl, 6-chlororesorcinol
2,4-dibenzoyl, 6-hexylresorcinol
2,4-di(4-chlorobenzoyl)resorcinol
2,4-di(4-bromobenzoyl)resorcinol
2,4-di(4-fluorobenzoyl)resorcinol
2,4-di(2,4-dichlorobenzoyl)resorcinol
2,4-di(2,4-dibromobenzoyl)resorcinol
2,4-di(2,4,6-trichlorobenzoyl)resorcinol
2,4-di(4-methylbenzoyl)resorcinol
2,4-di(4-butylbenzoyl)resorcinol
3,5-dibenzoyl, 2,4-dihydroxybenzoic acid, methyl ester
3,5-dibenzoyl, 2,4-dihydroxybenzoic acid, butyl ester
3,5-dibenzoyl, 2,4-dihydroxybenzoic acid, 2-ethylhexyl ester
3,5-dibenzoyl, 2,4-dihydroxybenzoic acid, phenyl ester
3,5-dibenzoyl, 2,4-dihydroxybenzoic acid, 4-chlorophenyl ester
3,5-dibenzoyl, 2,4-dihydroxybenzoic acid, 4-bromophenyl ester
2,4-di(monomethylphthaloyl)resorcinol
3,5-di(monomethylphthaloyl), 2,4-dihydroxybenzoic acid, methyl ester The polymers which may be employed in the compositions of this invention may be selected from a wide variety of polymers, such as polystyrene, polyethylene, and cellulosic esters and ethers. However, especially advantageous results are obtained when haloethylene polymers, such as the polymers of vinyl chloride, copolymers of vinyl chloride and vinylidene chloride, and copolymers of vinylidene chloride with other copolymerizable monomers in which the vinylidene chloride is present in an amount of at least 50 percent of the copolymer are employed, and such polymers are preferred in preparing the compositions. The haloethylene polymers present an unusual problem in that once degradation has started the effect seems to be autocatalytic, and thus the problem of stabilization is made more difficult.

Dibenzoyl resorcinol may be easily prepared from readily available materials by a number of known methods. One such method consists of subjecting an orthodichlorobenzene solution of resorcinol, benzoyl chloride, and a slight excess aluminum chloride to a temperature of 135° C. for one-half hour after which dilute HCl is added to the reaction mixture. The product may be purified by distillation or by recrystallization from methanol or by both processes. When produced by this method the product is found to consist substantially of from 75 to 90 percent of the 2,4-dibenzoyl resorcinol isomer and from 10 to 25 percent of the 4,6-dibenzoyl resorcinol derivative. Such mixtures present no problem, however, since the mixture has been found to be equivalent to either of the two isomers in light stabilizing effectiveness. The substituted derivatives of dibenzoyl resorcinol may be prepared by using the correspondingly substituted resorcinol or benzoyl chloride as starting materials.

The dibenzoyl resorcinol derivatives may be employed in amounts of from 0.1 to 10 percent by weight based on the weight of the polymer, preferably from 0.25 to 3 percent by weight. Most polymeric compositions comprise many ingredients such as plasticizers, fillers, pigments, and heat stabilizers, and the derivatives of this invention may be employed in the compositions in conjunction with such additives without any adverse effects. Likewise, the dibenzoyl resorcinol derivatives of this invention may be used in conjunction with other known light stabilizers. When so used, the dibenzoyl resorcinol derivative enhances the light stabilizing effectiveness of the known stabilizer to a surprising degree.

The ingredients may be intermixed by milling or blending by known conventional methods.

The compositions of this invention show superior resistance to degradation due to light over any previously known compositions. This superiority will be more apparent from the following illustrative examples in which all parts are by weight.

EXAMPLE 1

A series of three samples were made consisting of 90 parts of a copolymer prepared from a monomeric mixture consisting of 85 percent vinylidene chloride and 15 percent vinyl chloride, 7 parts of acetyl triethyl citrate as plasticizer and one part of tetrasodium pyrophosphate as a heat stabilizer. To one of the samples was added 2 parts of 2-hydroxy, 5-chlorobenzophenone, a known light stabilizer. The second sample had no light stabilizer added, and to the third sample was added 1 part of a mixture of 2,4- and 4,6-dibenzoyl resorcinol isomers. Each sample was molded into a sheet 0.01 inch thick. All of the sheets were then exposed to direct sunlight in the State of Florida for 3 months. After exposure the sheets were examined visually and rated for color according to an arbitrary scale in which 0 means no color, 5=yellow; 10=tan; and 20=black. The results of this test are given in Table I.

Table I

| Stabilizer | Original color | Color after exposure | Numerical rating |
| --- | --- | --- | --- |
| None | Colorless | Very dark brown. | 17 |
| 2-hydroxy 5-chlorobenzophenone. | Light yellow | Tan | 10 |
| Dibenzoyl resorcinol | Colorless | Slight yellowing | 4 |

From the results it can be seen that dibenzoyl resorcinol is far better as a light stabilizer for vinylidene chloride copolymers than is 2-hydroxy 5-chlorobenzophenone which is a commercially accepted light stabilizer. In addition, the dibenzoyl resorcinol does not impart an initial yellow color to the polymer as did the other stabilizer.

EXAMPLE 2

Samples were prepared to check the effectiveness of various substituent groups on the light stabilizing effectiveness of substituted dibenzoyl resorcinols. The formulation consisted of 100 parts of polyvinyl chloride, 50 parts of dioctyl phthalate, 3 parts of known organometallic heat stabilizers, 0.1 part of stearic acid as a lubricant, and 1 part of the new light stabilizer. The samples were prepared by milling on a two roll mill, after which they were molded into sheets having a thickness of 0.025 inch. The original color of the sheet was noted and the samples were then exposed to the radiation of a sunlamp for 35, 53 and 93 days which corresponds respectively to 500, 1000 and 2000 ultra-violet sun hours. The samples were examined after each period of exposure and the amount of color change from the original color rated according to an arbitrary scale. In this scale a rating of 0 means no change, 5 indicates yellowing, 10 indicates tan, and 20 indicates a black color. (When the samples had an original color which disappeared or was reduced on exposure a minus sign indicates the amount of bleaching that occurred. The higher the numerical value the greater was the bleaching.) The results are tabulated in Table II.

Table II

| Stabilizer | Original color | Color rating after time in days | | |
| --- | --- | --- | --- | --- |
| | | 35 | 53 | 93 |
| None | | 7 | 17 | 20 |
| Salol | Slightly yellow. | 2 | 4 | [1]6 |
| 2-hydroxy 5-chlorobenzophenone. | do | 0 | [2]4 | 20 |
| Monobenzoyl resorcinol | do | −1 | −1 | 0 |
| Tribenzoyl resorcinol | do | −2 | −2 | −2 |
| 2,4-dibenzoyl resorcinol | do | −4 | −4 | −4 |
| 4,6-dibenzoyl resorcinol | do | −6 | −6 | −6 |
| Di(4-chlorobenzoyl)-resorcinol | do | −5 | −5 | −5 |
| Di(2,4-dichlorobenzoyl)-resorcinol. | Yellow | −6 | −6 | −6 |

[1] Dark spots.
[2] Tacky surface.

From the tabulated results it can be seen that the new stabilizers give better protection than known light stabilizers and better than the closely related monobenzoyl resorcinol.

EXAMPLE 3

The light stabilizing effectiveness of dizenzoyl resorcinol in polystyrene was tested by thoroughly intermixing polystyrene with 1 percent of its weight of dibenzoyl resorcinol. Sheets were molded from both the stabilized composition and polystrene alone. The samples were checked for color by measuring the amount of transmittancy of light of 6200 A. minus the amount of transmittancy of light of 4200 A. After exposure to direct sunlight in the State of Florida for three months the color was again measured. The results are tabulated in Table III.

Table III

| Stabilizer | Transmittancy | | Percent Change in Transmittancy |
| --- | --- | --- | --- |
| | Original | After 3 Months | |
| None | 2.1 | 20.9 | 18.8 |
| Dibenzoyl resorcinol | 23.9 | 27.7 | 3.8 |

The results indicate that the sample having no stabilizer had greater than an 18 percent darkening in color while the sample stabilized with dibenzoyl resorcinol had less than 4 percent darkening.

EXAMPLE 4

Samples were prepared to test the compatibility and the effectiveness of mixtures of light stabilizers. The samples were prepared as in Example 2 except that the formulation consisted of 89 parts of a copolymer prepared from 85 percent vinylidene chloride and 15 percent vinyl chloride, 0.5 part of sodium tripolyphosphate, 0.5 part of disodium lauryl phosphate, 5 percent Hercoflex 600 as plasticizer, and a total of 5 percent of the indicated light stabilizers. The samples were exposed in the State of Florida for 3000 ultra-violet sun hours. They were checked periodically for amount of color change and the potentially useful life of the formulation taken to be the time required to reach a yellow color. These results are listed in Table IV.

Table IV

| 1st Stabilizer | Percent | 2d Stabilizer | Percent | Useful Life (Ultra-violet Sun Hours) |
| --- | --- | --- | --- | --- |
| 2-Chloro-5-hydroxy benzophenone. | 3.0 | | | 500 |
| Dibenzoyl resorcinol | 3.0 | | | >1,500 |
| 2-Chloro-5-hydroxy benzophenone. | 2.0 | Salol | 3.0 | 440 |
| Do | 2.0 | Dibenzoyl resorcinol. | 3.0 | >1,000 |

It can be seen that the mixtures containing dibenzoyl resorcinol are better than twice as stable to light as the mixtures containing the salol. Such an increase is of great significance when polymeric products are fabricated into articles which may be exposed to sunlight for prolonged periods.

EXAMPLE 5

A series of samples was prepared to check the effectiveness of the dibenzoyl resorcinol derivatives when used in compositions together with different plasticizers some of which could not be used previously due to resulting instability of the plasticized compositions. The basic formulation consisted of 91 parts of a copolymer prepared from a monomeric mixture consisting of 85 percent vinylidene chloride and 15 percent vinyl chloride, 0.5 part of sodium tripolyphosphate and 0.5 part of disodium lauryl phosphate as heat stabilizers, 3 parts of a mixture of 2,4- and 4,6-dibenzoyl resorcinol, and 5 parts of the plasticizer.

By way of comparison, a second series of samples was prepared identical to the first except that 3 parts of 2-hydroxy, 5-chlorobenzophenone were employed in place of the mixture of dibenzoyl resorcinol isomers.

All of the samples were mixed by milling on a two roll mill and then compression molded into test strips. The test strips were exposed to direct sunlight in the State of Arizona for 1000 ultra-violet sun hours. The strips were examined periodically for discoloration and the potential useful life of each composition taken as the number of ultra-violet sun hours needed to reach a yellow discoloration. These results may be found in Table V.

*Table V*

| Plasticizer | Useful Life (Ultra-violet Sun Hours) | |
|---|---|---|
| | Dibenzoyl Resorcinol | 2-Hydroxy, 5-Chloro-benzo-phenone |
| Acetyl trioctyl citrate | >1,000 | 400 |
| Pentaerythritol tetraester of a mixture of saturated fatty acids (ave. chain length=$C_6$) | >1,000 | 325 |
| Polyester of propylene glycol and adipic and lauric acids | >1,000 | 375 |
| Polyester of propylene glycol and sebacic acid | 540 | 275 |
| Chlorinated diphenyl (68% Cl) | 420 | 275 |
| Chlorinated terphenyl (42% Cl) | 310 | 200 |

The results show that the useful life of the articles can be extended from 1.5 to 3 times as long as that of similar articles made of previously known compositions. Thus, where some plasticizers could not be employed in the past because of the instability of the plasticized compositions to light, those same plasticizers may now be used in producing stable compositions.

The dibenzoyl resorcinols and their defined substitution products are useful light stabilizers for all thermoplastic compositions which are normally subject to discoloration due to ultraviolet radiation. Thus, in addition to the polystyrene, polyvinyl chloride, and vinyl chloride-vinylidene chloride copolymers of the examples, these agents exhibit their protective effect when incorporated in cellulose acetate, ethyl cellulose, polyacrylonitrile, and other thermoplastic film- or fiber-forming compositions.

I claim:

1. A light stable composition of matter comprising an organic thermoplastic synthetic polymeric material normally subject to discoloration on exposure to light and from 0.1 to 10 percent of the weight of said thermoplastic of a dibenzoyl resorcinol compound as a stabilizer having the general formula:

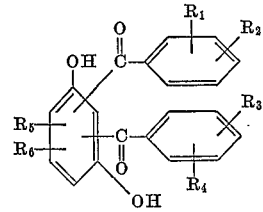

wherein $R_1$ to $R_5$, inclusive, are selected from the group consisting of H, Cl, Br, F, an alkyl group having from 1–8 carbon atoms, and —$COOR_7$ where $R_7$ is selected from the group consisting of an alkyl group having from 1–8 carbon atoms, phenyl, monochlorophenyl, monobromophenyl, and $R_6$ is selected from the group consisting of $R_1$, benzoyl, and benzoyl substituted with $R_1$ and $R_2$; there being not over 4 bromine atoms, not over 3 fluorine atoms, and not over 3 —$COOR_7$ groups in the compound, and not over one —$COOR_7$ group attached to any benzene ring and wherein any benzoyl substituents on said dibenzoyl resorcinol compound are positioned in non-vicinal relationship.

2. The composition claimed in claim 1 wherein the derivative of dibenzoyl resorcinol is present in an amount of from 0.25 to 3 percent by weight.

3. The composition claimed in claim 1 wherein the stabilizer is a mixture of 2,4-dibenzoyl resorcinol and 4,6-dibenzoyl resorcinol.

4. The composition claimed in claim 1 wherein the thermoplastic material is polyvinyl chloride.

5. The composition claimed in claim 1 wherein the thermoplastic material is a copolymer of vinylidene chloride and vinyl chloride.

6. The composition claimed in claim 1 wherein the thermoplastic material is a copolymer of at least 50 percent vinylidene chloride with the remainder of a monomer copolymerizable therewith.

7. A composition of matter comprising a copolymer composed of at least 50 percent vinylidene chloride with the remainder of a monomer copolymerizable therewith and from 0.1 to 10 percent, based on the weight of the copolymer, of a mixture of 2,4-dibenzoyl resorcinol and 4,6-dibenzoyl resorcinol.

8. A composition of matter comprising a predominantly vinylidene chloride copolymer and from 0.1 to 10 percent based on the weight of the copolymer, of di-(2-chlorobenzoyl)-resorcinol.

9. A composition of matter comprising a predominantly vinylidene chloride copolymer and from 0.1 to 10 percent based on the weight of the copolymer, of di-(4-chlorobenzoyl)-resorcinol.

10. A composition of matter comprising a predominantly vinylidene chloride copolymer and from 0.1 to 10 percent, based on the weight of the copolymer, of di-(2,4-dichlorobenzoyl)resorcinol.

11. A composition of matter comprising a predominantly vinylidene chloride copolymer and from 0.1 to 10 percent, based on the weight of the copolymer, of tribenzoyl resorcinol.

References Cited in the file of this patent

UNITED STATES PATENTS

| 2,157,068 | Carruthers et al. | May 2, 1939 |
| 2,568,894 | Mackey | Sept. 25, 1951 |

OTHER REFERENCES

Chemical Abstracts, Desai et al., "Friedel-Crafts Reaction V; vol. 34 (1940), col. 7875, line 14. (Copy in Sci. Lib.)

Organic Analysis, Interscience Publishers, N.Y., (1953), vol. 1, page 295, line 27 to page 296, line 11. (Copy in Div. 38.)